March 3, 1942. S. KALISZ 2,275,260
AUTO SIGNAL
Filed Aug. 28, 1939 2 Sheets-Sheet 1
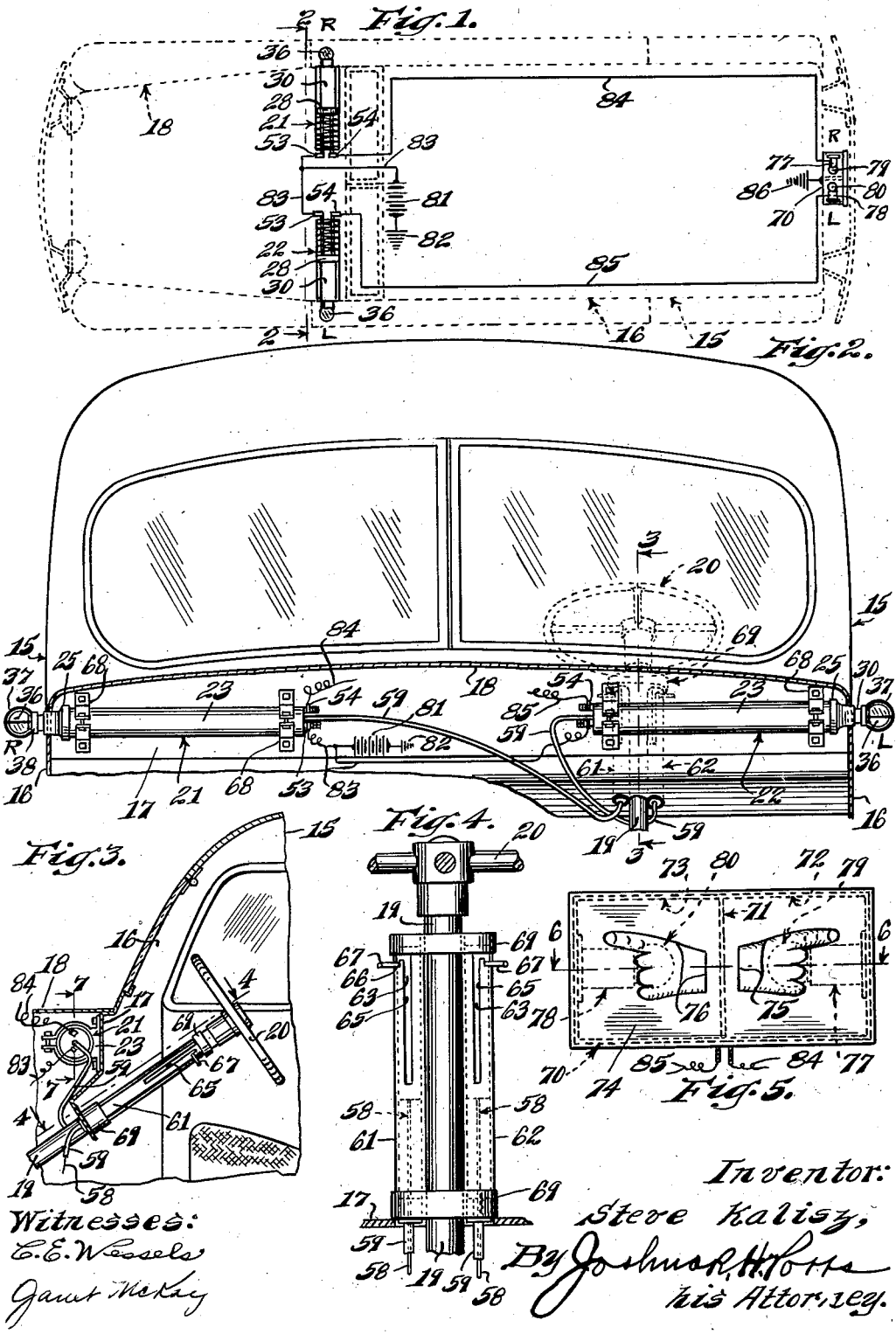
Inventor:
Steve Kalisz,
By Joshua R. Potts
his Attorney.
Witnesses:
C. E. Wessels
Janet McKay March 3, 1942.  S. KALISZ  2,275,260
AUTO SIGNAL
Filed Aug. 28, 1939  2 Sheets-Sheet 2
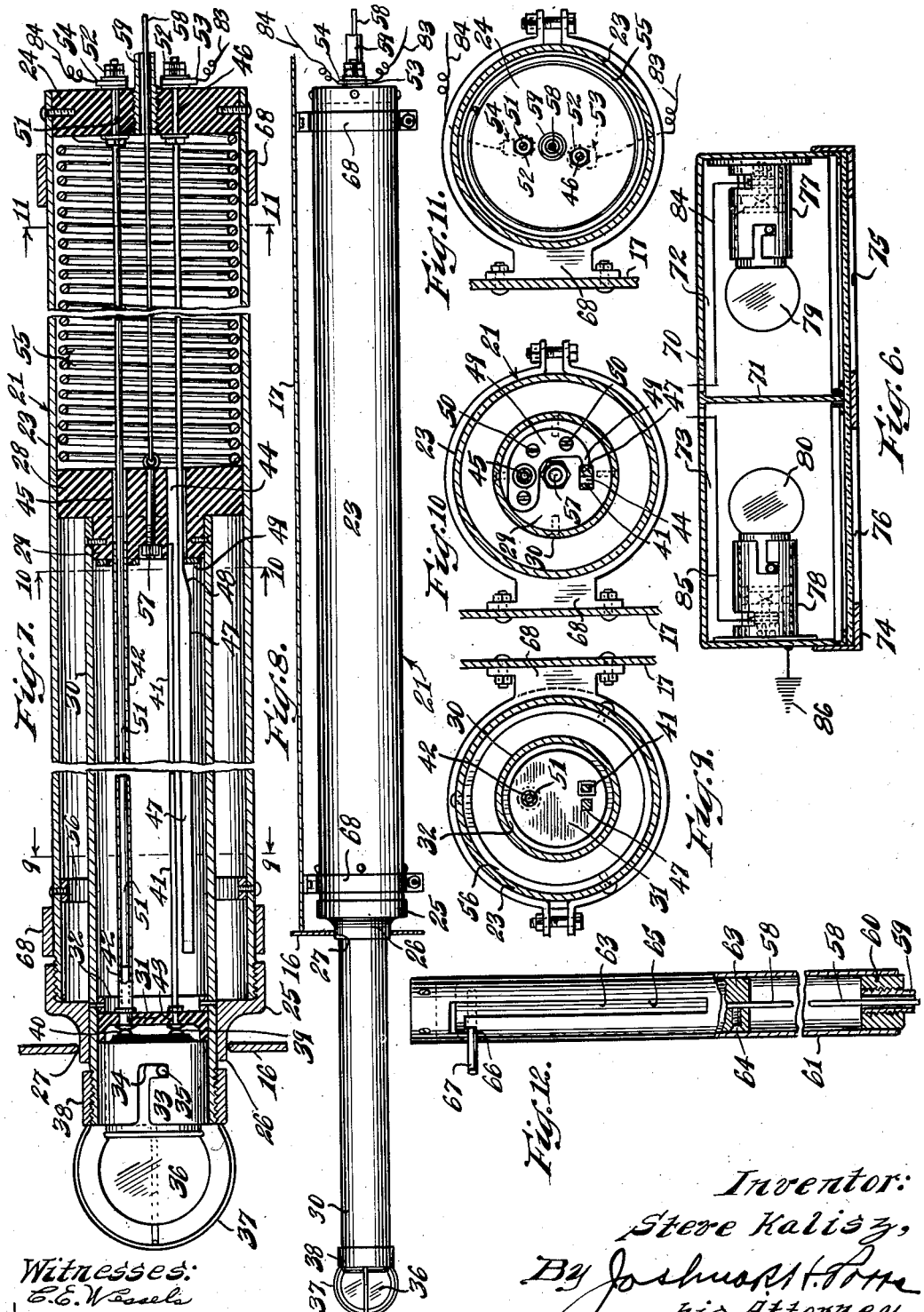
Inventor:
Steve Kalisz,
By Joshua R. H. Potts
his Attorney.
Witnesses:
E. E. Wessels
Janet McKay Patented Mar. 3, 1942

2,275,260

UNITED STATES PATENT OFFICE 2,275,260

AUTO SIGNAL

Steve Kalisz, Chicago, Ill.

Application August 28, 1939, Serial No. 292,229

10 Claims. (Cl. 177—329)

My invention relates to direction indicators for vehicles, especially automobiles or auto signals for indicating the direction, either right or left, in which the vehicle, such as an automobile, is about to be turned so that other drivers and pedestrians will be warned in advance and be able to control their movements accordingly so as to facilitate traffic control and avoid accidents.

The principal object of the invention is to provide an auto signal which will give an indication at the sides and front of a car, as well as at the rear, and in which the side and front signals are easily operated by the driver at the front and independently extensible and retractible at both sides to obviate the necessity of a driver or passenger extending an arm or hand from the sides of the car and which often results in injury from being struck by other vehicles.

Another object of the invention is to provide a normally retractible signal arm having a signal light which is automatically extinguished when the arm is retracted and which can be readily operated or manually released to be automatically projected by means of a spring, and at the same time close an electric circuit to a signal light especially for use after dark, without detracting the driver's attention from the steering wheel.

Other objects and advantages will appear hereinafter and be brought out more fully in the following specifications, reference being had to the accompanying drawings, wherein:

Fig. 1 is a diagrammatic view of the auto signal applied to a car shown in dotted lines;

Fig. 2 is an enlarged cross section taken on line 2—2 of Fig. 1;

Fig. 3 is a vertical section taken on the line 3—3 of Fig. 2;

Fig. 4 is a sectional plan taken on the line 4—4 of Fig. 3;

Fig. 5 is a face view of the rear signals;

Fig. 6 is an enlarged horizontal section on line 6—6 of Fig. 5;

Fig. 7 is an enlarged longitudinal section of one of the side or front signals taken on the line 7—7 of Fig. 3;

Fig. 8 is an elevation thereof with the signal extended;

Figs. 9, 10, and 11 are cross sections taken on the lines 9—9, 10—10 and 11—11 respectively of Fig. 7, and Fig. 12 is an enlarged sectional elevation of one of the operating and releasing units shown in Fig. 4.

Referring more particularly to the drawings, to illustrate the construction and operation of the invention there is shown a car, i. e., an automobile 15 or other vehicle having a body 16, a dash or cowl 17, a hood 18, a steering standard or post 19, and a steering wheel 20. There are two side operating and releasing units or signals which also serve for signals on or at the front of the auto, the right hand signal being designated at 21 and the left hand signal at 22. Each signal or unit comprises an elongated cylinder 23 supported in a horizontal position, the two being in horizontal alignment and spaced apart at their inner ends preferably on the dash or cowl 17. A plug 24 of insulation such as hard rubber, Bakelite or other dielectric material is secured in the inner end of each cylinder 23 in any suitable way, such as by screws, and a cap or reducing nipple 25, is threaded or otherwise secured over the other end of the cylinder 23 and has a reduced portion 26 to project through an opening 27 in the side wall of the body and suitably protected against the entrance of moisture as by tapering the reduced portion 26 to snugly fit the opening, packing or otherwise.

A plunger 28 is mounted to move in the cylinder 23 and is also insulation like the plug 24 and made of fibre or suitable material mentioned in connection therewith. This plunger has a reduced portion 29 concentric to the plunger proper projecting outwardly and has secured thereover an extensible arm in the form of an inner tube or cylinder 30, which telescopes in the outer cylinder 23.

An insulation cup or partition wall 31 is mounted near the outer end of the arm 30 or tube composing the same and is fitted in the end of the tube against a stop or shoulder 32 shown in the form of an internal collar or ring pinned or otherwise secured within the tube 30. A bushing 33, which may be insulation, is also fitted in the end of the tube 30, to abut the flange of the cup or partition wall 31 and has bayonet slots 34 opening through the outer end thereof engageable by pins 35 on the shell or plug of an electric bulb 36 which is fitted in the socket thus formed. A cage 37 is provided to protect the bulb and may be held on the tube by means of a collar 38, threaded or otherwise fastened on the tube, or in any other suitable fashion.

The shell of the bulb has two contacts 39 and 40 constituting the feed and return for the current of an electric circuit or what is known as a two point contact, suitably insulated from the shell and arm or cylinder composing the same. A rod 41 forming a conductor is anchored in the wall 31 and projects through the same to engage the contact 39, and another conductor 42, shown as a tube, is also fastened through the wall 31 to engage the contact 40 and both conductors are suitably anchored as shown on 43. The conductor 41 passes through a rectangular slot 44 in the plunger 28 and the conductor 42 passes through a hole 45, bored through the plunger.

A rod 46 is anchored to the plug 24 and overlaps or telescopes the rod 41. This rod 46 has a thickened camming portion 47 with an inclined or bevelled surface or portion 48 to engage a contact operating plate 49 secured to the plunger 28 on the front face of its reduced portion 29, said plate being secured in position as by means of screws 50 and suitably insulated from the conductor 42. A rod 51, also forming a conductor is anchored in plug 24 and telescopes or overlaps the conductor 42, and both of the rods or conductors 46 and 51 are held by clamping means 52 forming binding posts or terminals 53 and 54. An expansible or compression spring 55 is mounted in the cylinder 23 between the plug or end wall 24 and the plunger 28 and tends to normally project the arm and signal from the side of the car limited by a stop or annular internal shoulder 56 shown in the form of a ring screwed, or otherwise secured within the cylinder near the outer end thereof. An eyebolt or other suitable means 57 is anchored axially through the plunger 28 and a cable 58 is connected to the eye and passes through a flexible tube 59 which is anchored in a central hole in the plug and extends to the steering column or standard 19 where it is anchored in an apertured plug 60 of right and left hand cylinders 61 and 62 secured on each side of the steering post or column 19. A piston 63 operates in each cylinder 61 and 62 and the end of the cable 58 is anchored in the piston as by a screw 64. Each cylinder has a bayonet slot 65 longitudinally thereof with a lateral portion or offset spaced notch 66 forming a shoulder in which an operating arm 67, fastened at its inner end to the piston and projecting outwardly horizontal or laterally, is adapted to operate so that when the arm is in a notch 66 the signal is retracted and the plunger 28 drawn back or in to compress its corresponding spring 55, and when disengaged from the notch will slide down the slot 65 and permit the spring 55 of the corresponding arm to project the signal from the side of the car in lieu of the driver or a passenger sitting in the front seat extending an arm to designate direction of travel or movement of the vehicle. The cylinders 23 of the right and left side or front signals 21 and 22 are held in position as by means of brackets 68 which may be fastened to the cowl or dash and are preferably in the form of split clamps with apertured ears bolted together as shown or otherwise constructed. Suitable clamps 69 are provided to attach the cylinders 61 and 62 to the steering column at the top and bottom portions of said cylinders and the upper ends of the cylinders may be closed in any suitable manner.

The back or rear signals comprise a box or case 70 divided transversely by a vertical partition 71 into two compartments, being a right compartment 72 and a left compartment 73. The back of the box is open and has a cover plate 74 with right and left hand pointers 75 and 76 shown as a hand with the index finger extended and pointing in opposite directions and suitably backed by red or other colored glass or corresponding panel of transparent or translucent material which may be Celluloid, isinglass, or some fireproof material or plastic. Corresponding electric bulb sockets 77 and 78 are suitably mounted in the compartments 72 and 73 respectively to receive light bulbs 79 and 80 and the box is grounded to the frame of the car. The source of electric current or energy may be from a generator or a battery designated at 81 grounded to the frame, as shown at 82, with wires 83 extending to the binding posts 53 and then through the conductors 46 and 41 to the bulbs 36 while the return is through the conductors 42 and 51 and the binding posts 54.

Conductors from the binding posts 54 shown as wires 84 and 85 extend to the corresponding sockets 77 and 78 and are grounded to the frame as shown at 86, and whereas the connections to the bulbs 36 are made through the contacts 39 and 40 with the conductors 41 and 42, the bulbs 79 and 80 may have one point contacts and the other contact made between the socket and the shell of the bulb, inasmuch as the shells are grounded to the frame.

In the operation of the device, assuming that the auto is travelling along a road, street, or highway, and it is desired to make a turn either from one lane to another, to park the car or to the right or left at an intersecting street or road, ordinary deflections in straightaway travel excepted, the driver merely releases the desired operating arm 67 from its notch 66 by lifting the same and then allowing the arm to travel down in the slot 65, thereby releasing the corresponding cable 58 to slacken the same and permit the spring 55 to expand and move the plunger 28 outwardly to extend the arm or cylinder 30 and its corresponding light bulb 36. When this is done, the circuit to the light will be automatically closed. This may be done in any suitable manner, but as shown, the contact operating plate or edge of the elongated polygonal or rectangular slot 44 will engage the camming surface 48 of the portion 47 of conductor 46 and move or flex it into engagement with the conductor 41, these conductors in fact forming a switch or pair of contacts so that the bulbs will be illuminated when they are projected, either in advance, or at the time of making the turn, so that traffic may be regulated accordingly.

When the circuit is closed to either bulb 36, designating a right or left hand turn, the corresponding pointer at the back will also be illuminated to facilitate traffic regulation. To retract the signal arms and reset the device with the signals extinguished, the arms 67 are raised in the slots 65, moved laterally outwardly or turned on their pivots with the cylinders 63 and dropped into the notches 66 to permit the conductors or contacts 41 and 46, 47 to normally separate by reason of the plunger 28 being retracted to compress the spring 55 and move the walls of slot 44 past the camming surface 48 of the thickened or camming portion 47 of the conductor 46 to open the circuit to a signal. When a spring 55 is released, the circuit will be closed as previously described to ignite a signal. By reason of the construction described, the device may be economically manufactured and easily installed and since it operates positively by means of a spring when released, insofar as the side and front signals are concerned, there is nothing to get out of working order, such as when valves or pistons operate hydraulically, or by vacuum pressure or suction, created in the intake manifold of an automobile engine.

The device is positive and quick in operation and may be easily operated by the driver in advance of making a turn so that the likelihood of collisions or accidents may be avoided and without detracting the driver's attention from the steering and operation of the auto.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. An auto signal comprising an extensible illuminable arm, means for extending the arm, means for holding the arm retracted, means for releasing the latter means and means for illuminating the arms when extended, said means including extensible contacts, certain of said contacts being normally disengaged and adapted to be moved into engagement upon initial extension movement of the arm and remain engaged until entirely retracted.

2. An auto signal comprising an extensible arm, means for holding the arm retracted, means for releasing the latter means, said arm having spring means for projecting the same, illuminating means for the arm and overlapping conductors included in the circuit with the illuminating means, certain of said conductors being movable relative to the other conductors and certain of the conductors being normally out of contact with each other, one of the latter conductors being adapted to be moved into engagement with the adjacent conductor upon initial extension of the arm to close the circuit to the illuminating means and remain engaged while the arm is being projected and until the arm is retracted.

3. An auto signal comprising an extensible arm, means for holding the arm retracted, means for releasing the latter means, and means normally extinguished for illuminating the signal upon extension movement of the arm, said means including longitudinal conductors in circuit with the illuminating means and conductors carried by the arm and movable therewith, one of said conductors being normally separated from one of the first-named conductors and flexed into contact therewith upon initial extension of the arm to close the circuit to the illuminating means and remain in contact while the arm is being extended and until the same is retracted.

4. In an auto signal for indicating direction of turning, an extensible arm having an illuminating signal, expansible means for projecting the extensible portion of the arm, and an electric circuit, including contacts connecting to the signal and adapted to close the circuit therethrough, upon release of the expansible means, certain of said contacts being stationary and contacts telescoping therewith, one of the latter contacts being engaged with one of the first contacts and the others being normally separated and camming means for moving the latter contacts into engagement to close the electrical circuit when the arm is initially extended and remain engaged while the arm is being extended and until the same is retracted.

5. In an auto signal for indicating direction of turning, an extensible arm having an illuminating signal, expansible means for projecting the extensible portion of the arm, an electric circuit, including extensible contacts connecting to the signal and adapted to close the circuit therethrough upon release of the expansible means, certain of said contacts being normally separated and shifted laterally into engagement upon initial extension movement of the arm to close the electric circuit to the signal and remain in engagement while the arm is extended and until retracted.

6. In a direction indicator of the class described, comprising an extensible arm comprising telescoping sections, spring means tending to normally extend one section relative to the other, illuminating means at the outer end of the extensible section and an electrical circuit including overlapping contacts carried by the sections, certain of said contacts being normally separated and means to force said contacts together when the section is initially extended to close the circuit to the illuminating means to remain together while the section is extended and separate when the section is retracted.

7. In a direction indicator of the class described, comprising an extensible arm comprising telescoping sections, spring means tending to normally extend one section relative to the other, illuminating means at the outer end of the extensible section, an electrical circuit including overlapping telescoping contacts normally separated, means to cause the telescoping contacts to engage when the section is being extended to close the circuit to the illuminating means and means for retracting said section, said means including means to hold the same retracted.

8. A direction indicator comprising an extensible arm adapted to be mounted on a vehicle, said arm including a cylinder having a closed insulator end, a reduced extensible cylinder having an insulator plunger telescoping and movable in the first cylinder, an illuminating member on the outer end of the second cylinder and mounted to project through an opening in the vehicle smaller than the cylinder and outwardly therefrom, a spring between the closed end and plunger tending to normally project the second cylinder, means to operate the illuminating member upon initial projection of the extensible cylinder and thereafter until retracted and means to retract the plunger and second cylinder and hold the same in retracted position.

9. A direction indicator comprising an extensible arm adapted to be mounted on the side of a vehicle, said arm including a cylinder having a closed end, an extensible cylinder having a plunger telescoping and movable in the first cylinder, an illuminating member on the outer end of the second cylinder and mounted in an opening in the vehicle to be projected outwardly therefrom, a spring between the closed end and plunger tending to normally project the second cylinder, an electrical circuit including a source of energy, normally separated telescoping pairs of contacts carried by the cylinder, one pair of contacts being normally separated from the other and means engageable with the plunger to cause said latter contacts to be brought together when the spring acts to extend the second cylinder.

10. A direction indicator comprising an extensible arm adapted to be mounted on the side of a vehicle, said arm including a cylinder having a closed end, an extensible cylinder having a plunger at its inner end telescoping in the first cylinder and movable with the plunger in the first cylinder, an illuminating member on the outer end of the second cylinder and mounted in an opening in the vehicle to be projected outwardly therefrom, a spring between the closed end and plunger tending to normally project the second cylinder, an electrical circuit including a source of energy, oppositely extending overlapping contacts carried by the cylinder, one contact being normally separated from the other, means engageable with the plunger to cause said contacts to be brought together when the spring acts to extend the second cylinder, and means spaced from the outer end of the first cylinder for engagement by the plunger for limiting the extension of the second cylinder.

STEVE KALISZ.